June 22, 1948.  M. C. RICCIARDI  2,443,963
MEANS FOR CUTTING TUBES TO PRODUCE
TUBULAR FIBROUS CONTAINERS
Filed Feb. 14, 1944  2 Sheets-Sheet 1
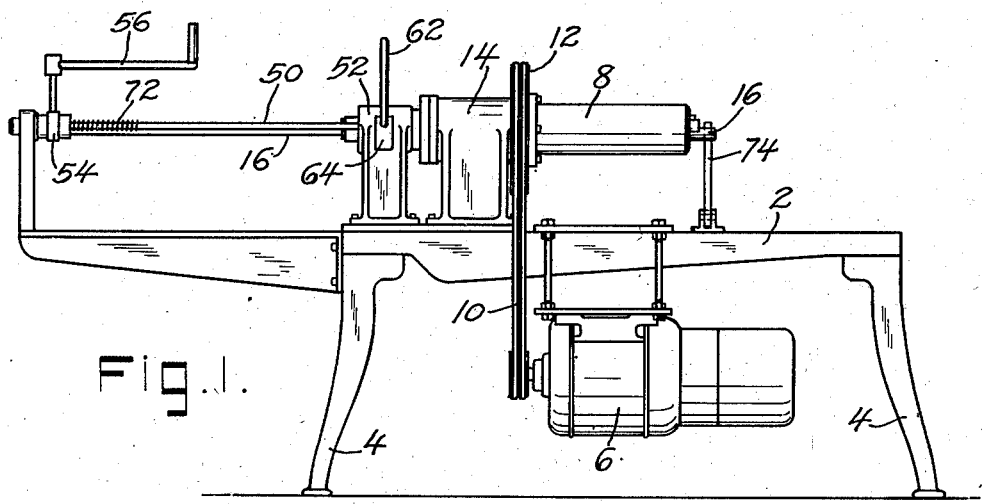
Fig. 1.
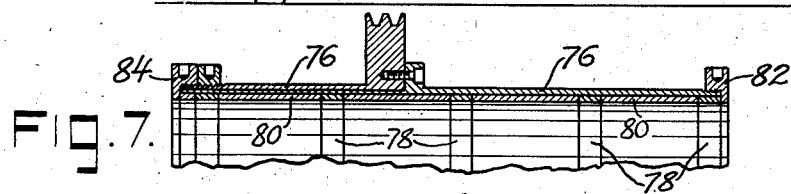
Fig. 7.
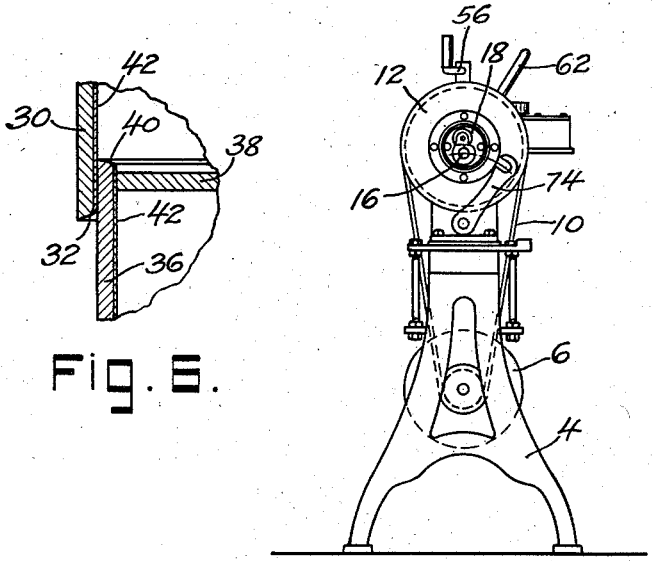
Fig. 6.
Fig. 2.
INVENTOR.
MATTHEW C. RICCIARDI
BY
Albert Sperry
ATTORNEY.

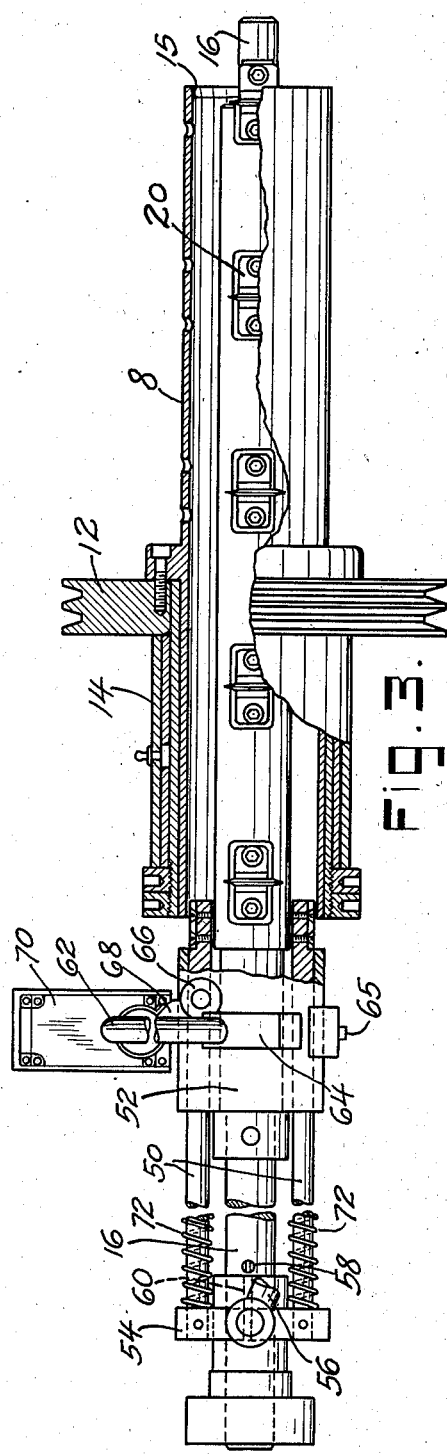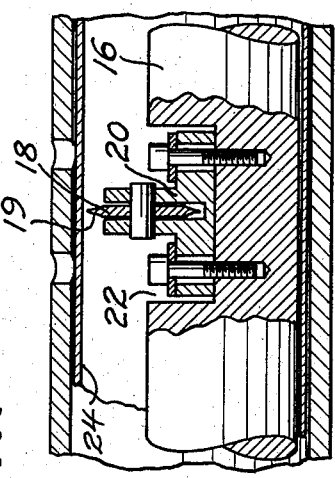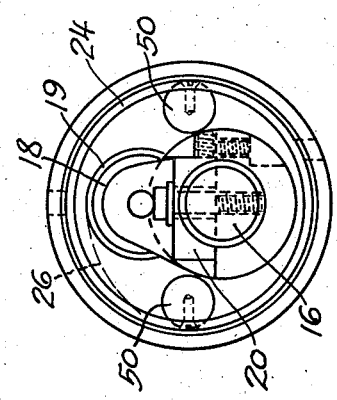
INVENTOR.
MATTHEW C. RICCIARDI
BY Albert Sperry.
ATTORNEY Patented June 22, 1948

2,443,963

UNITED STATES PATENT OFFICE 2,443,963

MEANS FOR CUTTING TUBES TO PRODUCE TUBULAR FIBROUS CONTAINERS

Matthew C. Ricciardi, Phillipsburg, N. J., assignor to The Canister Company, Inc., Phillipsburg, N. J., a corporation of New Jersey Application February 14, 1944, Serial No. 522,339

11 Claims. (Cl. 164—60)

My invention relates to machines and methods for cutting tubes and particularly to constructions adapted for use in producing tubular containers or closures formed of fibrous material.

Heretofore in manufacturing fibrous containers and slip covers made of fibrous material it has been usual practice to form tubing or relatively long tubes of spirally wound paper, fiber or the like, and to cut the tubing transversely into relatively short sections. However, in such cutting operations the cutting blade is passed across the tubing and moves from the exterior toward the interior of the tubing. Since the inner surface of the tubing is unsupported the cutting blade tends to force the material inward separating the plies of which the tubing is formed and producing a ragged inner edge or burr that projects toward the interior of the cut tube. The same type of inwardly projecting edge is formed when the tubing to be cut is formed of any other material and cut in the conventional manner.

The presence of a ragged inner edge or inwardly projecting burr on the extremity of a container body, slip cover or other tube section is objectionable because the rough edges have to be trimmed or ground off in order to permit the insertion of a close fitting closure into the end thereof or in order to slip the section over a container. Moreover, if the cutting blade presents a bevelled edge the cut end of the tube generally will be correspondingly bevelled and present an inner edge which is relatively thin and weak, thus increasing the difficulty of inserting a closure member into the end of a container body.

Furthermore, when the cut tube sections are used in producing the bodies of containers for oily material, such as paints or the like, the tubing from which the sections are formed is frequently provided with an inner liner of parchment or other water-proof paper. When such lined tubing is cut in the conventional manner by a cutting blade which passes from the exterior toward the interior of the tubing the blade further tends to strip the liner away from the fibrous body of the tubing exposing the body and thus rendering the resulting tube sections unsuitable for their intended use.

In accordance with the present invention these objections to tube cutting machines and methods of the prior art are overcome and machines and methods provided whereby tubing or lengths of tube formed of fibrous or other material may be cut into relatively short sections by cutting means which move from the interior toward the exterior of the tubing and toward a surface of the tubing which is supported during the cutting operation. In this way separation of the plies of fibrous material is prevented and the ends of the tube sections produced are provided with smooth outwardly turned or bevelled surfaces which tend to guide closure members into the ends of the tube sections or permit ready application of the tube sections to containers as slip covers.

One of the principal objects of my invention is to provide machines and methods for cutting tubes wherein a cutting element is moved from the interior toward the exterior of the tube to sever the tubing and prevent the formation of an inwardly extending burr thereon.

Another object of the invention is to provide a machine wherein tubular material being cut is supported on the exterior while being cut outwardly from the interior thereof.

Another object of the invention is to provide improved methods for cutting tubing whereby the tendency to separate the plies of which tubing may be formed or to strip a lining from the material is overcome.

A further object of the invention is to provide novel methods and means for forming fibrous tube sections presenting end portions with surfaces that are bevelled or inclined inwardly toward the tube from the outer surface thereof.

These and other objects and features of my invention will appear from the following description thereof wherein reference is made to the figures of the accompanying drawings.

In the drawings:

Fig. 1 is a side elevation of a preferred form of tube cutting machine embodying the present invention.

Fig. 2 is an end elevation of the machine illustrated in Fig. 1, as seen from the right end thereof.

Fig. 3 is a longitudinal view partly in section and partly in elevation showing details of the machine illustrated in Fig. 1.

Fig. 4 is an enlarged end view of the mandrel and cutting elements of the machine illustrated in Fig. 1.

Fig. 5 is a longitudinal sectional view of a part of the mandrel and cutter illustrated in Fig. 3.

Fig. 6 is a sectional view of a part of a container closure, and slip cover embodying the present invention, and Fig. 7 is a longitudinal sectional view through a portion of an alternative form of mandrel construction.

In that form of my invention illustrated in Figs. 1 to 5 of the drawings, the machine comprises a bed 2 which is mounted on supports 4 and carries a motor 6 for rotating the tubular mandrel 8. The mandrel is driven from the motor by a belt 10 which passes over a pulley 12 bolted or otherwise secured to the mandrel 8. The mandrel in turn is mounted for rotation within the bearing block 14 secured to the bed 2 of the machine.

The diameter of the mandrel 8 will vary with the size of the tubing to be cut and mandrels of different sizes may be used. However, in any case, the mandrel employed is sufficiently larger than the tubing to be cut to permit the ready insertion of a section of the tubing into the mandrel. The free end of the mandrel may be bevelled as indicated at 15 so as to direct the tube sections into the mandrel in charging the machine.

A shaft 16 extends longitudinally through the mandrel 8 but is positioned eccentric to the axis of rotation of the mandrel. Cutter elements such as the rotary cutting wheels 18 are mounted on the shaft 16 by means of the mounting blocks 20 set into recesses 22 in the shaft 16 and secured to the shaft by bolts or the like. The cutter elements project from the shaft 16 and the position of the shaft and cutters is such that rotation of the shaft causes the cutters 18 to swing outward toward the inner surface of the mandrel 8 and toward the inner face of a tube section 24 located in and rotated by the mandrel. In this way the cutters move from the interior toward the exterior of the tube as indicated by the dotted line 26 in Fig. 4.

Rotation of the tube sections 24 with the mandrel is insured by the operation of the cutters 18, which in the cutting operation move toward the rotating mandrel 8 thus compressing the material and urging it against the rotating surface of the mandrel 8. This insures the desired rotation of the tubing 24 without requiring a close fit of mandrel and tubing.

Any desired number of cutters 18 may be employed and they may be spaced longitudinally of the shaft 16 to sever the tubing into sections of any desired length. The length of the mandrel therefore should be sufficient to receive a length of the tubing of sufficient length to produce a number of tube sections in one operation.

With this construction the blades 18 of the cutting elements are located on the interior of the tube to be cut and are so spaced from the inner surface of the mandrel prior to the cutting operation that the fibrous tube may be readily inserted into the mandrel and about the shaft and cutters. Thereafter the mandrel is rotated by the motor 6 and belt 10 and the shaft 136 is rocked to move the cutter blades 18 outwardly against the inner surface of the tube so as to cause the tubing to rotate with the mandrel and at the same time cut the tubing into sections of the desired length.

As illustrated in Fig. 5, the cutting blade 18 is of a rotary type and has a bevelled edge 19 so that on cutting through the fibrous tubing from the interior toward the exterior, the part of the tube adjacent the blade is turned outward and is itself bevelled as illustrated in Fig. 6. The plies of material of which the tubing is formed are thus turned outward and compacted so that the inner surfaces of the cut edges of the resulting tube sections are smooth, strong and tapered toward the interior of the tube section.

The tube sections produced may be used as slip covers as shown at 30 in Fig. 6, the inner edges of the sections being somewhat rounded or bevelled by the cutting blades as shown at 32 so as to present a surface which will aid in guiding the cover into place about the member to which it is applied. Similarly, as illustated in Fig. 6, the cut tube section may be used as a container body 36 into which a closure member 38 may be inserted. When so used the insertion of the closure member is aided by compacted and inwardly tapered cut edge 40 of the body. This surface is free from any inwardly extending burr or ragged edge so that the closure member is guided into place whereas the body is strengthened and compacted at the cut edge and all danger of splitting the plies of the body apart or weakening the edge and all danger of tearing the inner liner of 42 from the containing body is avoided.

In order to discharge the cut sections from the tubular mandrel 8 after the fibrous tubing has been cut into a plurality of sections of the desired length, longitudinal extending rods or ejector members 50 are slidably mounted in a bearing block 52 which substantially closes the inner end of the mandrel. These rods are secured to a cross head 54 provided with a handle 56. The rods 50 are located adjacent the inner surface of the mandrel 8 and when retracted from an abutment against which a length of the fibrous tubing to be cut may be positioned. The cross head 50 is slidable on the eccentrically mounted shaft 16 so that after the tubing has been cut into sections the rods 50 may be moved longitudinally through the mandrel to push the tube sections out of the mandrel and thus clear the mandrel for receiving another length of tubing to be cut.

The rods 50 are positioned as shown in Fig. 4 so that when the cutters are in their retracted positions, as shown in full lines, they pass on opposite sides of the cutter blades 18 and shaft 16. In order to prevent the rods 50 from being advanced into the tubing during a cutting operation or into position to engage or injure the cutters 18, a pin 58 is mounted on the shaft 16 and the cross head 54 is provided with a slot indicated in dotted lines at 60 in Fig. 3. When shaft 16 and cutters 18 are rocked from their full line position in Fig. 4 toward a cutting position the pin 58 on shaft 16 is moved out of registry with the slot 60 so that the cross head cannot be advanced to the right as seen in Fig. 3 to eject the tubing or interfere with the cutting operation. However, when the shaft 16 and the cutters are returned to the full line position of Fig. 4 the pin 58 and slot 60 will register and the rods 50 then may pass freely through the mandrel on opposite sides of the cutters to eject the cut tube sections without engaging the cutters 18.

Rocking or rotation of the shaft 16 and cutters 18 to cut the tubing is effected by an operating handle 62 which extends through a slot 64 from the bearing block 52 and is movable to the left from the full line position of Fig. 2, or downward from the full line position of Fig. 3 to rock the shaft 16 and move the cutters toward the inner surface of the mandrel and the tubing placed therein. Movement of the handle 62 and cutters 18 is limited by the adjustable stop 65. The handle 62, when in its full line position, engages a roller 66 on the end of a spring pressed switch operating arm 68 which controls operation of the motor 6.

With this construction the arm 68 is urged toward the left, as seen in Fig. 3, by a spring (not shown) which may be housed in the switch box 70. Movement of the cutter operating handle 62 to the left, as seen in Fig. 2, serves first to disengage the roller 66 on the switch operating arm 68 and the arm 68 is then free to move to the left, as seen in Fig. 3, to start the motor 6 for rotating the mandrel 8. Thus the first action resulting from the movement of the handle 62 initiates rotation of the mandrel and the length of the tube carried thereby, whereas further movement of the handle 62 serves to rock the eccentrically mounted shaft 16 and the cutters 18 through the arm 26 until the cutters engage the tubing and force it against the mandrel to insure rotation of the tubing and to cut the tubing into sections. Thereafter when the tubing has been cut into sections the handle 62 is moved back to its full line position whereupon it engaged the roller on the switch operating arm 68 to move said arm to the right, as seen in Fig. 3, and break the circuit for driving the motor. At the same time, the pin 58 on shaft 16 is moved into registry with the slot 60 in the cross head 54 to permit longitudinal movement of the cross head 54 and the ejecting rods 50 for ejecting the cut tube sections from the mandrel. The handle 56 on the cross head may then be grasped and moved to the right, as seen in Fig. 1, so that the severed tube sections are pushed out of the end of the mandrel.

Springs 72 on the ejecting rods serve to cushion the action of the ejecting rods and cross head when they are moved to eject the tube sections and thus prevent injury to the bearing block 52. After ejecting the cut tubes from the mandrel the cross head and ejecting rods are returned to the full line position shown in the drawings, clearing the mandrel to receive a new length of the tubing to be cut.

During the cutting operation the cutter blade 18 first engages the inner liner of the tube being cut and forces the tube against the inner surface of the mandrel so that the tube is supported at its outer surface during the cutting operation and is urged against the inner surface of the mandrel so as to be rotated positively thereby. At the same time the inner surface of the tube is compressed and turned or bevelled outwardly by the cutter blade to form the compacted and bevelled cut surface on the end of the tube sections. The resulting cut edge requires no trimming, burnishing or other operations to remove ragged or projecting edges and the tube sections produced are ready for use directly to receive a closure in forming a container or for use in forming covers adapted to be slipped over a container.

When the mandrel 8 is relatively long or is relatively small in diameter, it is sometimes desirable to provide an outer end bearing for the eccentrically mounted shaft 16 so that the shaft will be properly positioned during rotation thereof and while the length of tubing is being cut into sections. For this purpose a pivoted bearing member 74 may be mounted on the bed 2 of the machine and movable into position to engage the free end of the shaft 16. The bearing 74 may be moved to its full line position as seen in Fig. 2 to disengage the end of the shaft 16 so that the mandrel is unobstructed during the operations of charging a length of tubing into the mandrel and when discharging cut sections of the tube from the mandrel. However, it may be swung into a vertical position to support and accurately position the shaft during the cutting operation.

It also is desirable in some instances to provide the mandrel with replaceable cutting rings or bushings located opposite the cutting elements in position to cooperate therewith in severing the tubing into sections. As illustrated in Fig. 7 the mandrel 76 may be provided with cutting rings 78 positioned to support the tubing during the cutting operation and held in place by spacer rings 80 and retainer members 82 and 84. The cutting rings are positioned opposite the cutting elements or knives 86 and may be formed of hardened steel or any other suitable material desired. With this construction the cutting rings may be replaced readily and economically and they can be spaced or arranged to correspond to the positions of the cutting elements when they are increased or decreased in number or otherwise rearranged. At the same time the mandrel itself, which is relatively more expensive can be used continuously and with bushing or cutting rings of different internal diameter.

In operating the mechanism described the diameter of the mandrel employed and the number of cutting elements used will be determined by the size of the tube used and the type of a product to be produced. Thus, in a typical case, when forming container bodies six inches in length and four inches in diameter the mandrel may be four-and-a-half inches in diameter and two feet or more in length. The lengths of tubing to be cut into sections will conveniently be somewhat more than two feet in length and are severed to form four container bodies. Such a length of tubing is inserted into the end of the mandrel until it engages the ends of the retracted ejecting rods 50. During insertion of the tubing the mandrel is stationary. Thereafter the operating handle 62 is moved to the left, as seen in Fig. 2, or downward as shown in Fig. 3, so that it disengages the end of the switch operating arm 68 and the motor is then started so that the cutter and tubing are rotated. Continued movement of the operating handle forces the cutters against the inner surface of the tubing and forcibly urges the tubing against the mandrel to insure rotation of the tube. The tubing is thus cut into sections of the desired length after which the operating handle 62 is returned to its full line position so that it engages the switch operating arm to stop the motor. The mandrel then ceases to rotate and the ejecting rods are moved to discharge the cut sections from the mandrel. The mandrel is thus emptied and again may be charged with a new length of tubing and the cycle of operations repeated.

While I have illustrated and described the machine with particular reference to the manufacture of fibrous container bodies and slip covers for containers, it will be apparent that the apparatus may be used in cutting tubing formed of other materials wherein it is desirable to form a bevelled outwardly turned surface on the end of the tube. The number and position of the cutters used in any particular construction may be varied as desired and the type of cutting element employed also is capable of modification. In view thereof it should be understood that the particular embodiment of my invention illustrated in the drawings and herein described is intended to be illustrative of my invention and it is not intended to limit the scope of the following claims.

I claim:

1. A machine for severing tubing comprising means for rotating the tubing to be severed about the longitudinal axis thereof, a shaft positioned eccentrically with respect of the axis of said tubing, a cutter mounted on said shaft and projecting therefrom, means for rotating said shaft to move said cutter toward the inner surface of the tubing to cut the tubing from the interior toward the exterior thereof and means on the exterior of the tube for supporting the tube in the area in which it is cut.

2. A machine for cutting tubing into sections comprising means for rotating the tubing to be cut about the longitudinal axis thereof, a shaft positioned eccentrically with respect to the axis of said tubing, a plurality of cutters spaced longitudinally of said shaft and projecting therefrom, and means for rotating said shaft to move said cutters toward the inner surface of the tubing to cut the tubing from the interior toward the exterior thereof and into sections of predetermined length.

3. A machine for cutting tubing comprising a tubular mandrel adapted to receive the tubing to be cut, means for rotating said mandrel and tubing about the longitudinal axis thereof, a cutter located within the mandrel and tubing, means for moving said cutter toward the inner surface of the mandrel to engage the tubing and cut the same from the interior toward the exterior thereof, and means for ejecting the tubing from said mandrel.

4. A machine for cutting tubing into sections comprising a tubular mandrel adapted to receive the tubing to be cut, means for rotating the cutter and tubing about the longitudinal axis thereof, a plurality of cutters located within the mandrel and tubing and spaced longitudinally thereof, means for moving the cutters toward the inner surface of the mandrel to engage the tubing and cut the same from the interior toward the exterior of the tubing and into sections of a predetermined length, and means movable longitudinally of said mandrel to eject the sections of tubing therefrom.

5. A machine for cutting a tubing comprising a tubular mandrel adapted to receive the tubing to be cut, means for rotating said mandrel and tubing about the longitudinal axis thereof, a shaft located eccentrically with respect to said mandrel and tubing and having a cutting element projecting therefrom, and means for rotating said shaft to move the cutting element toward the inner surface of the mandrel to engage said tubing and cut the same from the interior toward the exterior thereof.

6. A machine for cutting tubing comprising a tubular mandrel adapted to receive the tubing to be cut, means for rotating said mandrel and tubing about the longitudinal axis thereof, a shaft located eccentrically with respect to said mandrel and tubing and having a cutting element projecting therefrom, means for rotating said shaft from a neutral position to a cutting position to move the cutting element toward the inner surface of the mandrel to engage said tubing and cut the same from the interior toward the exterior thereof, ejecting means movable to discharge cut tubing from said mandrel and cooperating means connected to said shaft and ejecting means to prevent operation of the ejecting means when said shaft is moved from said neutral position.

7. A machine for cutting tubing comprising a tubular mandrel adapted to receive the tubing to be cut, means for rotating said mandrel and tubing about the longitudinal axis thereof, a shaft located within said mandrel and tubing and having a cutting element carried thereby, means for moving said cutting element from a retracted position toward the inner surface of the mandrel to engage said tubing and cut the same from the interior toward the exterior thereof, ejecting means having a part thereof movable to a retracted position adjacent the inner end of said mandrel, means for moving said ejecting means longitudinally of the mandrel to eject cut tubing from the mandrel, and means for holding said ejecting means in its retracted position when said cutting element is moved from its retracted position.

8. A machine for cutting a length of fibrous tubing comprising a tubular mandrel adapted to receive a length of the tubing to be cut, means for rotating said mandrel and tubing about the longitudinal axis thereof, a shaft located eccentrically within said mandrel and tubing and having a plurality of rotatable cutters spaced longitudinally of said shaft and presenting bevelled cutting edges, and means for rotating said shaft to move the cutters toward the inner surface of the mandrel and against the tubing to cut the tubing from the interior toward the exterior thereof and form a bevelled cut edge on the sections of tubing produced.

9. A machine for cutting tubing comprising driving means for rotating the tubing to be cut about the longitudinal axis thereof, a cutter located within the tubing being rotated by said driving means, operating means for moving said cutter toward the inner surface of the tubing to cut the tubing from the interior toward the exterior thereof, and means responsive to movement of said operating means for controlling said driving means.

10. A machine for cutting tubing comprising a tubular mandrel adapted to receive the tubing to be cut, driving means for rotating said mandrel and tubing about the longitudinal axis thereof, a cutter located within said mandrel, operating means for moving said cutter toward the inner surface of the mandrel to engage tubing rotated thereby and cut the tubing from the interior toward the exterior thereof, means for ejecting cut tubing from the mandrel, and means actuated by said operating means for controlling the operation of said driving and ejecting means.

11. A machine for cutting tubing comprising a tubular mandrel adapted to receive the tubing to be cut, means for rotating said mandrel and tubing about the longitudinal axis thereof, a cutter located within the mandrel and tubing, means for moving said cutter outward toward the inner surface of the mandrel to engage the tubing and cut the same from the interior toward the exterior thereof, and a replaceable cutting ring mounted for rotation with said mandrel and presenting an inwardly facing anvil-like surface normal to the edge of said cutter and in position to be engaged by the cutter for supporting the tubing during the cutting thereof.

MATTHEW C. RICCIARDI.

REFERENCES CITED

The following references are of record in the file of this patent:

UNITED STATES PATENTS

| Number | Name | Date |
| --- | --- | --- |
| 540,881 | Sponsel | June 11, 1895 |
| 628,595 | Barrows | July 11, 1899 |
| 1,006,574 | Lorenz | Oct. 24, 1911 |
| 1,622,253 | Putt et al. | Mar. 22, 1927 |
| 2,304,828 | Joy | Dec. 15, 1942 |